United States Patent [19]
Renner

[11] Patent Number: 4,779,350
[45] Date of Patent: Oct. 25, 1988

[54] CONVEYOR GAGE APPARATUS

[75] Inventor: Gerald M. Renner, Columbus, Ohio

[73] Assignee: AT&T Bell Laboratories, Murray Hill, N.J.

[21] Appl. No.: 852,556

[22] Filed: Apr. 16, 1986

[51] Int. Cl.$^4$ .......................... G01B 5/04; G01B 5/14
[52] U.S. Cl. .................................... 33/146; 33/147 K
[58] Field of Search .................... 33/144, 146, 147 K, 33/147 L

[56] References Cited

U.S. PATENT DOCUMENTS

| | | | |
|---|---|---|---|
| 1,427,773 | 9/1922 | Barrett | 33/147 K |
| 2,835,039 | 5/1958 | Shutkufski | 33/147 K |
| 2,849,797 | 9/1958 | Etchell | 33/147 K |
| 2,873,533 | 2/1959 | Wilson | 33/147 K |
| 3,032,883 | 5/1962 | Meyer | 33/147 K |
| 3,376,649 | 4/1968 | Finley | 33/147 K |
| 4,027,397 | 6/1977 | Theurer et al. | 33/287 |

FOREIGN PATENT DOCUMENTS 553702  8/1957  Italy ..................................... 33/146

Primary Examiner—Richard R. Stearns
Attorney, Agent, or Firm—Dwight A. Marshall

[57] ABSTRACT

An alignment gage (1) for use in aligning rails (2) of conveyor systems. The apparatus comprises a pair of plate members (10) each configured for mounting on and riding finger members (21) attached to a moving carrier (20) positioned in a channel (22) of a rail of the conveyor system. Spring members (11) mounted on the plate members maintain the plate members in a spaced apart relationship with each plate member in continuous engagement with corresponding ones of the finger members in alignment with a corresponding one of the conveyor rails. Travel indicating apparatus (12) mounted on the plate members continuously measure alignment of the rails as the plate members are carried along the rails by the finger members of the conveyor system.

8 Claims, 1 Drawing Sheet

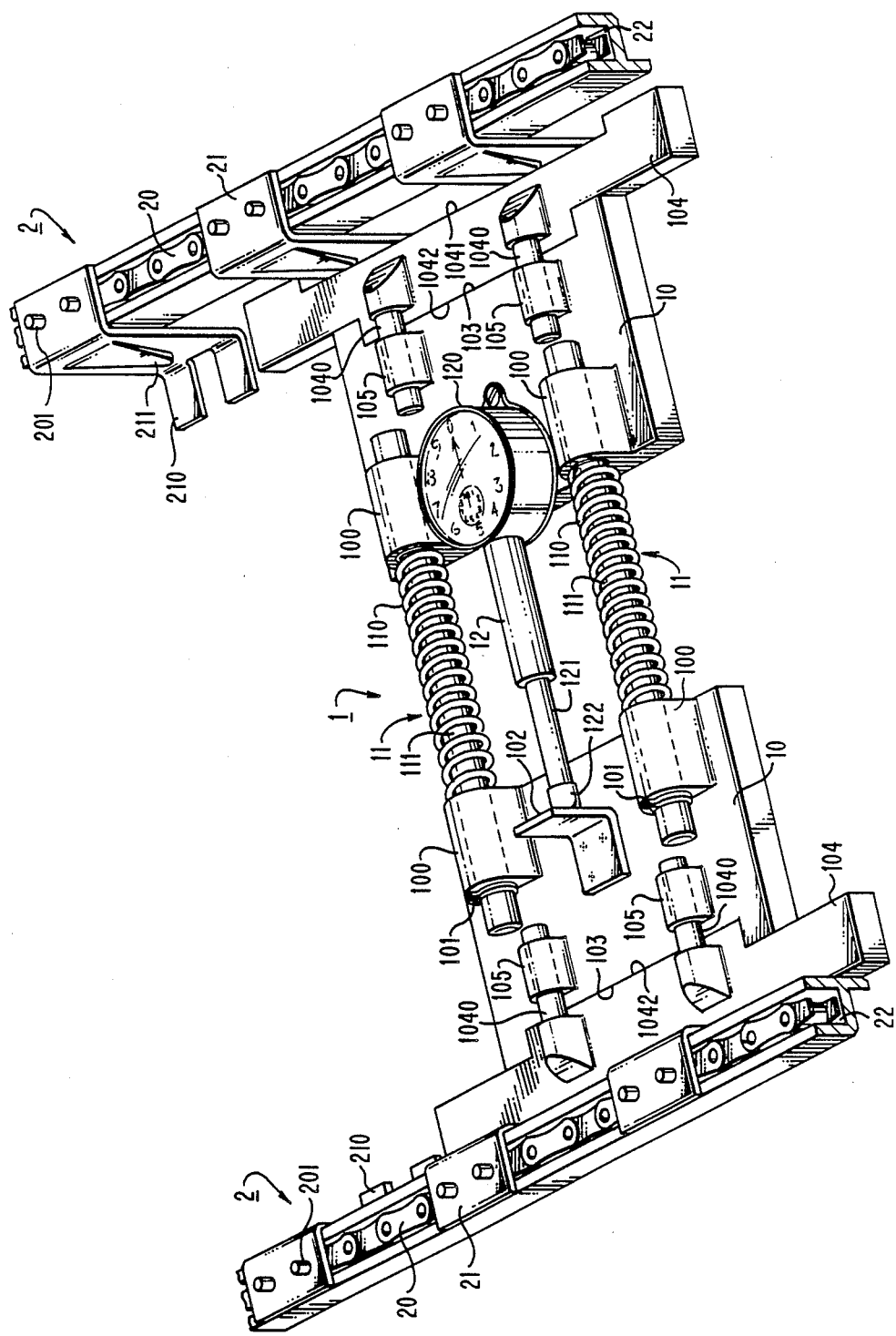

4,779,350

CONVEYOR GAGE APPARATUS

TECHNICAL FIELD

This invention relates to gage apparatus. In particular, it relates to gage apparatus for use in aligning conveyor systems.

BACKGROUND ART

Conveyor systems have a wide use in manufacturing applications and are oftentimes used in moving and assembling items such as circuit boards used in electrical and electronic systems. In general a conveyor system used in the assembly of circuit boards has a pair of parallel rails each having a moving carrier with attached finger members that move the circuit boards along the conveyor system from one assembly operation to another. For example, a blank circuit board may be loaded onto the moving carrier finger members of the conveyor system. As the blank circuit board moves along the conveyor system, holes may be drilled into the circuit board at one assembly operation so that components comprising a part of the circuit board electrical circuit may be mounted onto the circuit board.

In subsequent assembly operations, components such as capacitors, resistors, coils, microprocessors and the like are inserted into holes of the circuit board during various assembly operations. The conveyor system may then move the component populated circuit board into a wave soldering assembly operation wherein the moving carrier finger members position the circuit board for soldering the components to printed wiring circuitry of the circuit board. After the wave soldering assembly operation, the conveyor system may move the soldered circuit board into yet another assembly operation to cleanse soldering and other types of debris from the assembled circuit board.

A problem arises in the use of conveyor systems in that the rails may go out of alignment causing the finger members to drop or warp the circuit boards thereby resulting in extensive damages. When such problems arise in the operation of a conveyor system, the conveyor system must be shut down until the misaligned section can be located and realigned. This requires that a maintenance person physically move along the conveyor system measuring the distance between the rails of the conveyor system to locate the misaligned section.

Accordingly, a need exists for gage apparatus to measure the alignment of conveyor systems. A need also exists for gage apparatus to continuously measure the alignment of conveyor system rails as the gage moves along the conveyor system.

SUMMARY OF THE INVENTION

The foregoing problems are solved and a technical advantage is achieved by gage apparatus intended for use in aligning parallel rails of a conveyor system wherein each of the rails has a moving carrier with finger members attached thereto for holding material. The gage apparatus is configured for mounting on and riding the finger members along the rails of the conveyor system while maintained in continuous engagement with opposed finger members as the carrier moves along the conveyor rails. The gage apparatus continuously indicates alignment of the conveyor rails as the gage apparatus is carried by the finger members along the conveyor system.

In accordance with the invention, gage apparatus for aligning parallel rails of a conveyor system wherein each of the rails has a moving carrier with finger members attached thereto for holding material comprises a pair of plate members each having one side configured for snap mounting onto and in alignment with opposing ones of the carrier attached finger members.

Also in accordance with the invention, gage apparatus for aligning parallel rails of a conveyor system wherein each of the rails has a moving carrier with finger members attached thereto comprises spring apparatus slidably mounted on each of a pair of plate members to extend therebetween for maintaining the plate members in a normally spaced apart relationship with each of the spaced apart plate members in continuous engagement with the opposing ones of the finger members as the plate members move along the conveyor system rails.

Also in accordance with the invention, gage apparatus for aligning parallel rails of a conveyor system wherein each of the rails has a moving carrier with finger members attached thereto for holding material comprises travel indicator apparatus mounted on one of a pair of normally spaced apart plate members mounted on and aligned with ones of the finger members attached to the moving carrier. A plunger member connected with the travel indicator apparatus and extending between the plate members and terminating on the opposite plate member indicates the alignment of the conveyor rails as the plate members are carried along the conveyor system.

In further accordance with the invention, gage apparatus for aligning parallel rails of a conveyor system wherein each of the rails have a moving carrier with fingers attached thereto has a pair of normally spaced apart plate members each having a side for mounting on and aligning the gage apparatus with opposing ones of the finger members. Adapter plates mounted on the plate members extend the aligning side of each plate member to conform the gage apparatus with spacing between rails of various size conveyor systems.

DESCRIPTION OF THE DRAWING

The foregoing, as will other objects, features, and advantages of the invention, will be more apparent from a description of the drawing in which;

FIG. 1 sets forth conveyor gage apparatus embodying the principles of the instant invention.

DESCRIPTION OF THE INVENTION

Referring now to the drawing, gage apparatus 1 set forth therein is intended for use in aligning a conveyor system that may, for example, be used in the assembly of material such as circuit boards. The conveyor system set forth in the present embodiment of the invention comprises a pair of parallel rails 2 each having a channel 22 wherein is located a moving carrier 20. Attached to each carrier 20 are a number of spaced apart finger members 21 each oppositely positioned along one rail 2 from finger members 21 of the other rail 2. Each finger member 21, attached to pins 201 of carrier 20, extends downward alongside rail 2 and is formed with a right angle at the end thereof to form arms 210. A finger member 21 also has a spring section 211 positioned thereon such that a circuit board may be located between rails 2 and pressed downward onto finger members 21 pushing spring section 211 into the main body of finger member 21. As the circuit board comes to rest on arms 210, spring section 211 snaps outward and over an edge of the circuit board to hold the circuit board in place on arms 210. As carrier 20 moves along channel 22, finger members 21 carry material, such as circuit boards, along parallel rails 2 of the conveyor system.

During operation of the conveyor system, parallel rails 2 may go out of alignment causing opposing finger members 21 to move apart and drop circuit boards thereby causing extensive damage. Parallel rails 2 may also go out of alignment such that opposing finger members 21 mover closer together thereby warping circuit boards again causing extensive damage. Gage apparatus 1 is intended for use in aligning parallel rails 2 of the conveyor system such that rails 2 always remain in a defined spaced apart relationship thereby insuring that finger members 21 carry material such as circuit boards without damage.

Referring again to the drawing, gage apparatus 1 comprises a pair of plate members 10 each formed of a sturdy flat material such as stainless steel. Each plate member 10 has one side configured with a channel 103 that enables gage apparatus 1 to be mounted on and aligned with ones of finger members 21. In addition, the edge of each plate member 10 is configured such that gage apparatus 1 may be positioned between opposing ones of finger members 21 and moved downward thereon to force spring section 211 in against the body of finger member 21. When plate member 10 is properly positioned against arms 210, spring section 211 snaps outward from the body of finger member 21 such that plate members 10 are snap mounted and held in place on ones of finger members 10.

A pair of bushings 100 made of a material such as brass are located on each of plate members 10 and each bushing 100 has an axial bore located at right angles to aligning channel 103 for slidably receiving rod 111. In assembly, one end of each of a pair of rods 111 is inserted into the axial bore of each bushing 100 of a first plate member 10 so that the pair of rods 111 extend outward from an edge of the first plate member 10. A snap ring 101 is attached to one end of the rods 111 and a spring member 110 is inserted over the opposite end of each rod 111 thereby forming spring apparatus 11 extending outward from the first plate member 10. A second plate member 10 is positioned adjacent the first plate member 10 with the opposite ends of the pair of rods 111 inserted into the axial bore of bushings 100 of second plate member 10. Snap rings 101 are attached to ends of rods 111 extending from bushings 100 of second plate member 10 thereby compressing spring members 110 which in turn exert forces on both plate members 10 to maintain each plate member 10 in a spaced apart relationship with adjacent plate member 10. As gage apparatus 1 is loaded between rails 2 of the conveyor system and positioned on opposing finger members 21, spring apparatus 11 functions to maintain the adjacent pair of plate members 10 in a spaced apart relationship and is compressed to exert a force to maintain side channel 103 in one embodiment of the invention of each plate member 10 in continuous engagement with corresponding finger members 21 and in alignment with a corresponding conveyor rail 2.

Gage apparatus 1 also has travel indicator apparatus 12 that is mounted on and extends between adjacent plate members 10. Travel indicator apparatus 12 may, although not limited thereto, be a dial indicator having a plunger member 121 with contact point, hereinafter referred to as end cap 122, and a dial indicator 120 for registering the distance of travel of plunger member 121. Dial indicator 120 may be visual whereby a rotatable hand indicates the distance of travel of plunger member 121. In addition, dial indicator 120 may have a revolution counter or may be a digital indicator capable of transmitting travel data to remote monitors and computer terminals.

Travel indicator apparatus 12 is mounted on and affixed to one of plate members 10. Plunger member 121 connected with dial indicator 120 extends between the pair of plate members 10 with end cap 122 terminated on the adjacent plate member 10 by being abutted against a perpendicular back plate 102 mounted on adjacent plate member 10. When the pair of plate members 10 of gage apparatus 1 are snap mounted onto and in alignment with ones of opposing finger members 21, travel indicator apparatus 12 indicates the distance between plate members 10 as a measure of the alignment of conveyor rails 2. As gage apparatus 10 is carried along conveyor system by finger members 21 attached to moving carrier 20, travel indicator apparatus 12 continuously measures the alignment of rails 2.

Gage apparatus 1 may be adapted for various size conveyor systems by the addition of adapter plates 104. Each adapter plate 104 may be formed with one edge having a flange 1042 intended to be fitted into channel 103 of a plate member 10. In addition, a pair of pins 1040 affixed to each adapter plate 104 are each inserted into an axial bore of one of a second pair of bushings 105 mounted on plate members 10. Adapter plates 104 also have the edge opposite flange 1042 configured similar to a corresponding aligning edge 103 of a plate member 10 to have a channel 1041 formed for mounting gage apparatus 1 on and in alignment with finger members 21. Thus, adapter plates 104 extend the aligning side of each plate member 10 to conform with the spacing between rails 2 of various size conveyor systems.

SUMMARY

It is obvious from the foregoing that the facility, economy and efficiency of conveyor systems may be substantially enhanced by gage aligning apparatus. It is further obvious from the foregoing that gage apparatus arranged to continuously measure the alignment of rails of a conveyor system as the gage apparatus is carried along the conveyor system greatly reduces the time required to realign and maintain alignment of conveyor systems.

What is claimed is:

1. Gage apparatus (1) comprising
    means for aligning parallel rails (2) of a conveyor system wherein each of the rails have a moving carrier (20) with finger members (21) attached thereto for holding material
    characterized in that
    said aligning means comprises
    a pair of plate members (10) each configured for mounting on and riding the finger members along the rails of the conveyor system,
    a pair of spring means (11) mounted on said pair of mounting and riding plate members for maintaining said pair of mounting and riding plate members in a spaced apart relationship and in continuous engagement with opposed ones of the finger members as the carrier moves along the conveyor rails, and
    means (12) mounted on said pair of mounting and riding plate members for continuously indicating alignment of the conveyor rails as said pair of mounting and riding plate members are carried along the conveyor rails.

2. The gage apparatus set forth in claim 1 characterized in that
said pair of plate members each comprise
a plate member (10) having one side configured into a channel (103) for receiving and snap mounting on ones of the carrier attached finger members in alignment therewith.

3. The gage apparatus set forth in claim 2 characterized in that
said pair of spring means each comprise
a rod member (111) slidably mounted on each of said plate members to extend therebetween and each rod member having a spring member (110) mounted thereon for maintaining said plate members in a normally spaced apart relationship and each of said spaced apart plate members in continuous engagement with corresponding carrier fingers as said pair of plate members move along the rails of the conveyor system.

4. The gage apparatus set forth in claim 3 characterized in that
said alignment indicating means comprise
travel indicating means (120) mounted on one of said plate members and having a plunger member (121, 122) connected therewith to extend between said plate members and terminate on said other plate member for indicating the distance between said plate members as a measure of the alignment of the parallel conveyor rails as said plate members are carried along the conveyor system.

5. The gage apparatus set forth in claim 4 characterized in that
said plate members comprise
adapter means (104) mounted on each of said plate members for extending the outer edge of each of said plate members to conform with spacing between opposing finger members of the conveyor system.

6. Gage apparatus 1 for aligning parallel rails (2) of a conveyor system wherein each of the rails have a moving carrier (20) with finger members (21) attached thereto for holding material comprising
a pair of flat plate members (10) each having one side configured into a channel (103) for receiving and alignment with ones of the fingers members and for snap mounting thereon,
a pair of spring means (11) each slidably mounted on each of said flat plate members to extend therebetween for maintaining said flat plate members in a normal spaced apart relationship with said one side of each flat plate member in continuous engagement with corresponding ones of said finger members and in alignment with a corresponding one of the conveyor rails, and
travel indicating means (12) mounted on one of said flat plate members and having a plunger member (121, 122) connected therewith to extend between said flat plate members and terminate on said other flat plate member for indicating the distance between said flat plate members as a measure of the alignment of the conveyor rails as said flat plate members are carried along the conveyor system.

7. Gage apparatus (1) for aligning parallel rails (2) of a conveyor system wherein each of the rails have a moving carrier (20) with finger members attached thereto for holding material comprising
a pair of flat plate members (10) each having one side (103) configured with a channel for alignment with ones of the finger members and for snap mounting thereon,
a pair of rod members (11) each slidably mounted on a side opposite said channel side of each of said flat plate members to extend therebetween and each rod member having a spring member mounted thereon for maintaining said flat plate members in a spaced apart relationship with said one channel side of each flat plate member in continuous engagement with corresponding ones of said finger members and in alignment with a corresponding one of the conveyor rails, and
travel indicating means (12) mounted on one of said flat plate members and having a plunger member (121, 122) connected therewith to extend from a perpendicular back plate (102) mounted on said other flat plate member between said flat plate members and terminate on said other flat plate member for indicating the distance between said flat plate members as a measure of the alignment of the conveyor rails as said pair of flat plate members are carried along the conveyor system.

8. The gage apparatus set forth in claim 7 wherein said gage apparatus comprises
adapter plate apparatus (104) mounted on each of said flat plate members for extending said aligning side of each flat plate member to conform with spacing between rails of various size conveyor systems.

* * * * *